(12) United States Patent
Lin et al.

(10) Patent No.: US 8,827,503 B2
(45) Date of Patent: Sep. 9, 2014

(54) OPTICAL LENS FOR LIGHTING FIXTURE

(71) Applicant: Genius Electronic Optical Co., Ltd., Taichung (TW)

(72) Inventors: Yi-Jie Lin, Taichung (TW); Chih-Chieh Wu, Taichung (TW); Yen-Wei Ho, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 127 days.

(21) Appl. No.: 13/716,530

(22) Filed: Dec. 17, 2012

(65) Prior Publication Data

US 2014/0104853 A1 Apr. 17, 2014

(30) Foreign Application Priority Data

Oct. 12, 2012 (TW) .............................. 101137746 A (51) Int. Cl.
*F21V 5/04* (2006.01)
(52) U.S. Cl.
CPC ....................................... *F21V 5/04* (2013.01)
USPC ........................................... 362/335; 362/317

(58) Field of Classification Search
USPC ............................. 362/311.01, 317, 326, 335
See application file for complete search history.

(56) References Cited

FOREIGN PATENT DOCUMENTS

| TW | M378351 | 4/2010 |
|---|---|---|
| TW | M380480 | 5/2010 |
| TW | M397532 | 2/2011 |

*Primary Examiner* — Vip Patel
(74) *Attorney, Agent, or Firm* — Bacon & Thomas, PLLC (57) ABSTRACT

An optical lens for lighting fixture includes a body, which comprises a bottom surface and a light-exit surface at opposing bottom and top sides thereof, an elongated groove formed in the bottom surface, a light incident surface, a first intersection line and a second intersection line respectively connected between the two ends of the elongated groove and the bottom surface, a first line segment and a second line segment respectively connected between the light incident surface and the bottom surface, a first virtual line defined between the two ends of the first line segment, a first distance that is the shortest distance between the two ends of the first intersection line, and a SAGi that is the shortest distance between any point at the first line segment and the first virtual line and satisfies the equation: 0≤|SAGi/first distance|×100≤2.8.

10 Claims, 11 Drawing Sheets

FIG.17
PRIOR ART

OPTICAL LENS FOR LIGHTING FIXTURE

CROSS-REFERENCE TO RELATED APPLICATION

This application claims priority of Taiwan Application No. 101137746, filed on Oct. 12, 2012, the disclosure of which is incorporated herein by reference.

BACKGROUND OF THE INVENTION

1. Field of the Invention

The present invention relates to an optical lens design and more particularly, to an optical lens for lighting fixture.

2. Description of the Related Art

Taiwan Patent No. M397532 discloses an optical lens for streetlight, which mainly uses the outer curved surface of the lens to achieve a rectangular light distribution pattern. Further, Taiwan Patent No. M378351 discloses a convex lens for LED light source, which has the outer curved surface of the lens configured to shift the illumination area and to satisfy the desired distribution of light emission. Further, Taiwan Patent No. M380480 discloses an asymmetric streetlight LED lens, which also has the outer curved surface of the lens configured to shift the illumination area and to satisfy the desired distribution of light emission.

Figure 15:
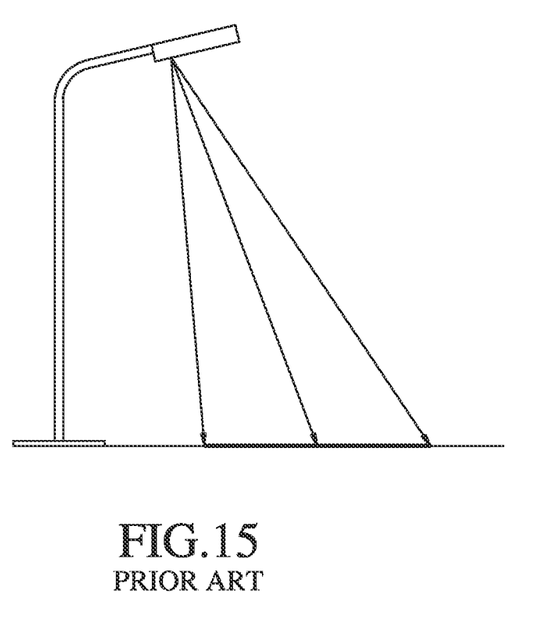
FIG. 15 is a schematic drawing illustrating the radiation of a LED streetlight onto a road according to the prior art.
Figure 16:
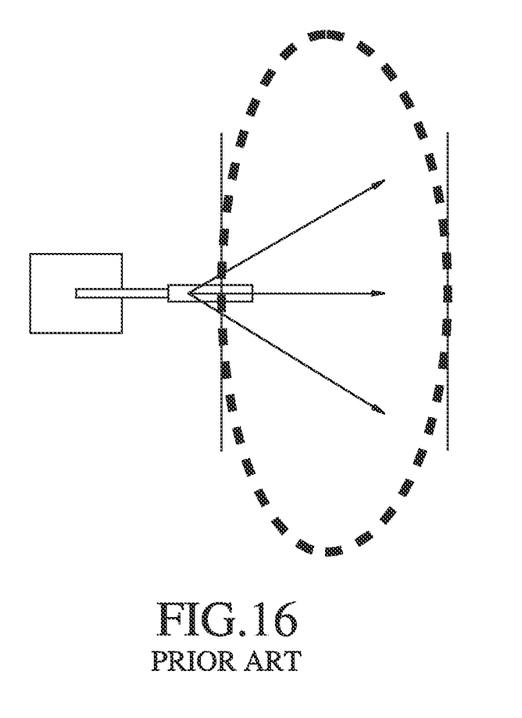
FIG. 16 is a schematic drawing illustrating an oval-shaped pattern of the illumination range of the LED streetlight according to the prior art.

However, the aforesaid prior art techniques do not disclose any inner curved surface lens design to achieve a rectangular light distribution pattern, As shown in FIGS. 15 and 16, the isolux distribution of a conventional LED streetlight has approximately an oval-shaped pattern. In this oval-shaped pattern, the corner area has a relatively low illumination, i.e., non-uniform illumination.

Figure 17:
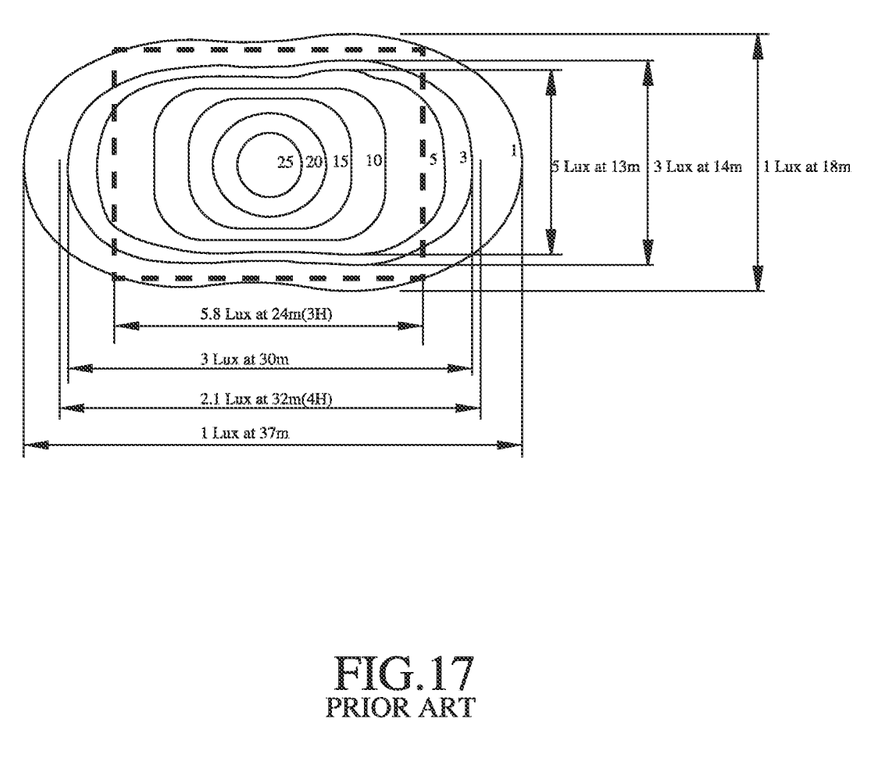
FIG. 17 is a schematic drawing illustrating the isolux distribution of the LED streetlight according to the prior art.

As shown in FIG. 17, if the conventional LED streetlight has a height of 8 m and an illumination range of 24 m×16 m (as indicated by the imaginary line), the luminous flux will be 5000 lm, and the central illuminance will be 28.0 lux.

From FIGS. 15 and 16, it can be known that the corner illuminance is about 1~3 lux The lower corner illuminance may affect uniformity of illumination. Further, the light utilization efficiency of this conventional design of LED streetlight is about 60%, and its uniformity of illumination is about 0.4, i.e., this conventional design of LED streetlight has a lower uniformity in illumination and a low light utilization efficiency.

SUMMARY OF THE INVENTION

The present invention has been accomplished under the circumstances in view. It is the main object of the present invention to provide an optical lens for lighting fixture, which has an inner curved surface thereof configured to improve light utilization efficiency and uniformity of illumination.

To achieve this and other objects of the present invention, an optical lens for lighting fixture comprises a body. The body comprises a bottom surface and a light-exit surface at opposing bottom and top sides thereof, an elongated groove being concave in the direction towards the inner side of the body formed in the bottom surface for accommodated a light source, a first axis and a second axis located on the bottom surface and extending perpendicularly across each other to the periphery of the body in such a manner that the first axis is longer than the second axis and the major axis of the elongated groove is parallel to the second axis, a first end surface and a second end surface respectively located on the two ends of the elongated groove and intersected with the second axis, a light incident surface being part of a wall of said elongated groove and connected with said first and second end surfaces, a first intersection line and a second intersection line respectively formed in the intersection between the first end surface and second end surface and the bottom surface, the light incident surface being formed of at least one curved surface portion, the at least one curved surface portion being connected to the bottom surface at two opposite sides of the elongated groove to form a first line segment at one side of the elongated groove and a second line segment at an opposite side of the elongated groove, the first line segment and the second line segment being disposed at two opposite sides relative to the major axis of the elongated groove in a symmetric manner relative to the second axis, the at least one curved surface portion being disposed at two opposite side relative to the second axis in an symmetric manner, a first virtual line being a straight line connected between two opposite ends of the first line segment, a first distance defined as the shortest distance between two opposite ends of the first intersection line, the shortest distance between any point at the first line segment and the virtual line being defined to be SAGi that satisfies the equation: $0 \leq |SAGi/\text{first distance}| \times 100 \leq 2.8$.

Preferably, a height of the first end surface is smaller than that of the second end surface.

Preferably, a second distance is defined as the shortest distance between the two ends of the second intersection line and is greater or equal to the first distance.

Preferably, the first end surface is a planar surface or curved surface, and the second end surface is a planar surface of curved surface.

Preferably, the first end surface and second end surface are disposed perpendicularly to the bottom surface.

Preferably, the first end surface and the second end surface both face and incline downwardly toward the inside of the elongated groove and are respectively connected to the bottom surface.

Preferably, the at least one curved surface portion is an elliptic surface, spherical surface, aspherical surface, or their combination.

Preferably, the amount of the at least one curved surface portion is 2, and the two curved surface portions are disposed at two opposite sides relative to said first axis in an asymmetric manner.

Preferably, the light-exit surface is asymmetric relative to the first axis.

Preferably, the body has an annular surface between the light-exit surface and the bottom surface.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1-5, an optical lens for lighting fixture in accordance with a first embodiment of the present invention is shown. The optical lens, referenced by 1, comprises a lens body 10.

The lens body 10 comprises a bottom surface 11 located at a bottom side thereof, a light-exit surface 19 located at a top side thereof, an elongated groove 12 being concave in the direction towards the inner side of the body formed in the bottom surface 11 for accommodating a light source (not shown), and a light incident surface 13 formed of the radial wall of the elongated groove 12 and extending along the length of the elongated groove 12. Further, the bottom surface 11 of the lens body 10 defines a first axis A1 that extends between two opposing ends thereof, and a second axis A2 that extends between two opposing sides thereof across the first axis A1 in a perpendicular manner. The first axis A1 is longer than the second axis A2. In this embodiment, the light source is a LED light source. Further, the light-exit surface 19 is asymmetric relative to the first axis A1. The asymmetric design of the light-exit surface can be adjusted subject to the desired illumination area. Further, accommodating a light source in the elongated groove 12 can easily be achieved by conventional techniques. No further illustration will be necessary in this regard.

The major axis of the elongated groove 12 is disposed in parallel to the second axis A2. Further, the elongated groove 12 has a first end surface 121 at its one end and a second end surface 122 at its other end. The first end surface 121 and the second end surface 122 are respectively intersected with the second axis A2. Further, a first intersection line 111 is formed between the first end surface 121 and the bottom surface 11, and a second intersection line 112 is formed between the second end surface 122 and the bottom surface 11. Further, the first end surface 121 can be a planar surface or curved surface, and the second end surface 122 can also be a planar surface or curved surface. In this embodiment, both the first end surface 121 and the second end surface 122 are planar surfaces. Further, in this embodiment, the first end surface 121 and the second end surface 122 are disposed perpendicularly to the bottom surface 11 of the body M. Further, a height of the first end surface 121 is smaller than the height of the second end surface 122.

The light incident surface 13 is formed of two curved surface portions 131. The two curved surface portions 131 are respectively connected to the bottom surface 11 at two opposite sides of the elongated groove 12, thereby forming a first line segment L1 in the intersection at one side of the elongated groove 12 and a second line segment L2 in the intersection at the other side of the elongated groove 12. The two curved surface portions 131 are symmetric relative to the second axis A2. Further, the first line segment L1 and the second line segment L2 are disposed at two opposite sides relative to the major axis of the elongated groove 12 in a symmetric manner relative to the second axis A2. In this embodiment, the two curved surface portions 131 are disposed at two opposite side relative to the first axis A1 in an asymmetric manner.

In this embodiment, the two curved surface portions 131 are disposed at two sides in an asymmetric manner relative to the first axis A1. Although these two curved surface portions 131 are disposed in an asymmetric manner relative to the first axis A1 in this embodiment, they can also be designed to be symmetric relative to the first axis A1 to satisfy the demand for a different illumination area. The curved surface portions 131 can be elliptic surfaces, spherical surfaces, aspherical surfaces, or their combination. In this embodiment, the curved surfaces are elliptic surfaces.

Figure 2:
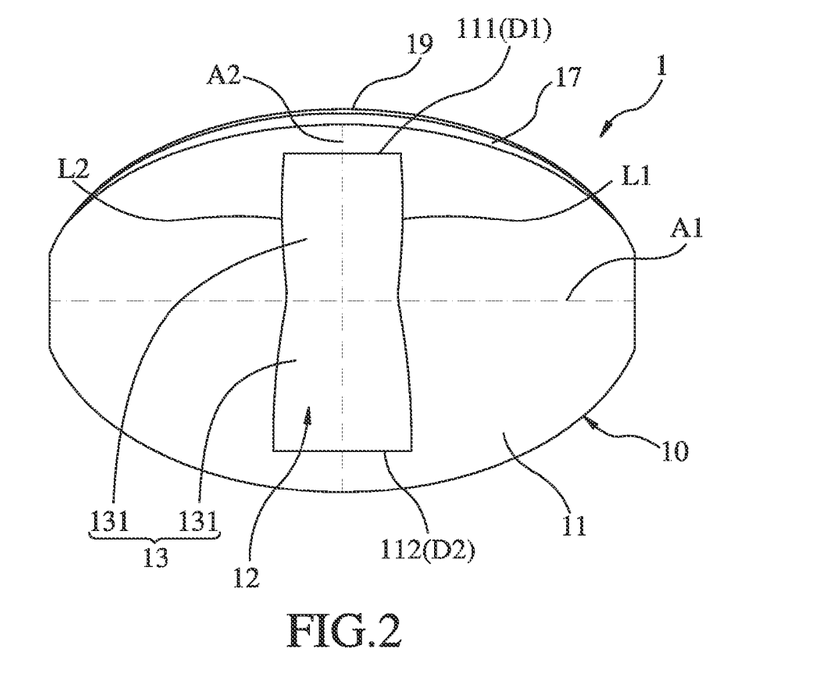
FIG. 2 is a bottom view of the optical lens for lighting fixture in accordance with a first embodiment of the present invention.
Figure 4:
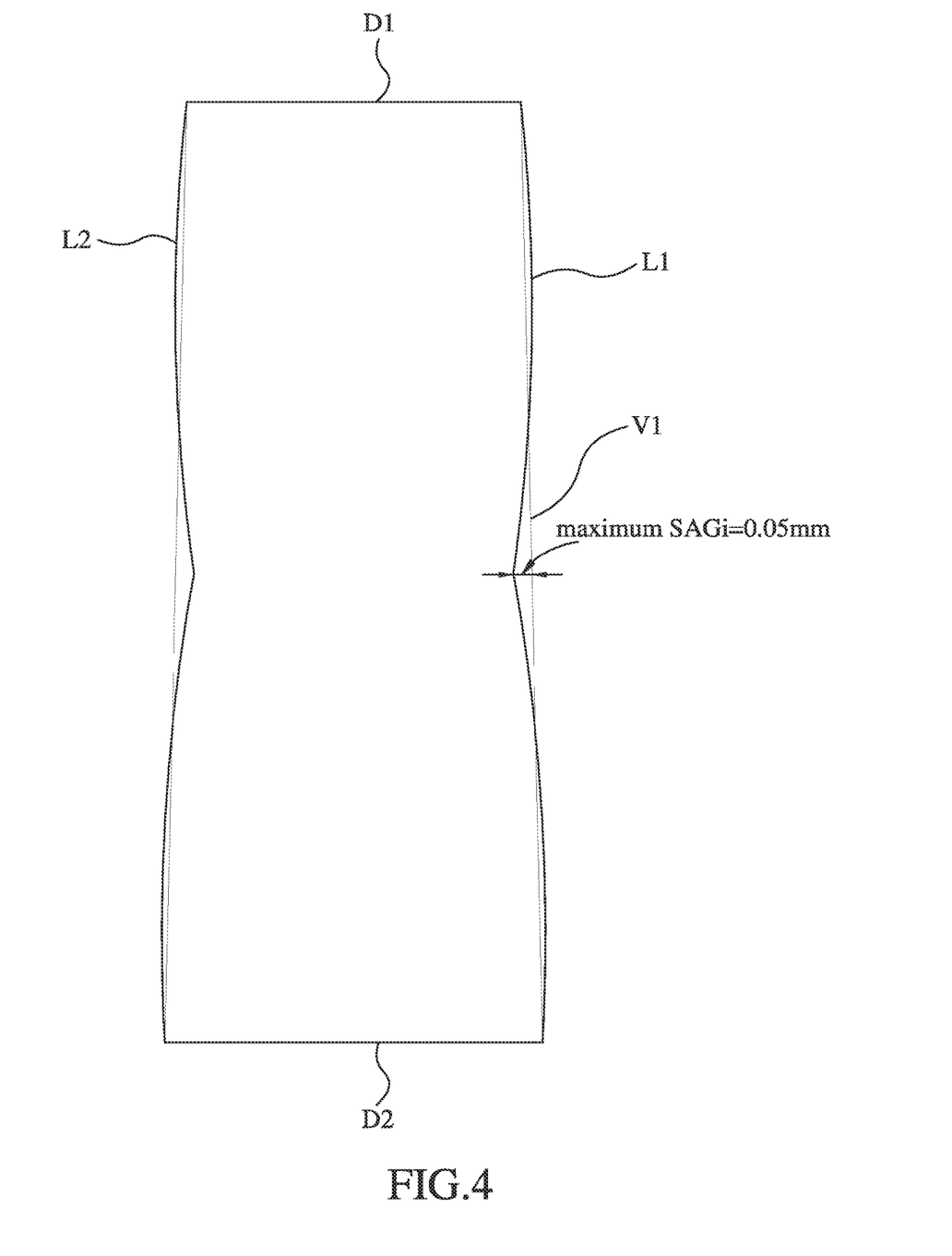
FIG. 4 is an enlarged view of a part of FIG. 2, illustrating the location and status of the maximum SAGi.

The straight line between the two ends of the first line segment L1 is defined to be a first virtual line V1. The shortest distance between the two ends of the first intersection line 111 is defined to be a first distance D1. The shortest distance between any point T at the first line segment L1 and the first virtual line V1 is defined to be SAGi, and SAGi satisfies the following equation (1):

$$0 \leq |SAGi/\text{first distance}| \times 100 \leq 2.8 \qquad \text{Equation (1)}$$

In the aforesaid example, the definition of the first virtual line V1 is based on the first line segment L1. However, subject to the symmetric relationship between the first line segment L1 and the second line segment L2, the second line segment L2 can be used to define another virtual line (not shown) that is symmetric to the first virtual line V1.

Figure 1:
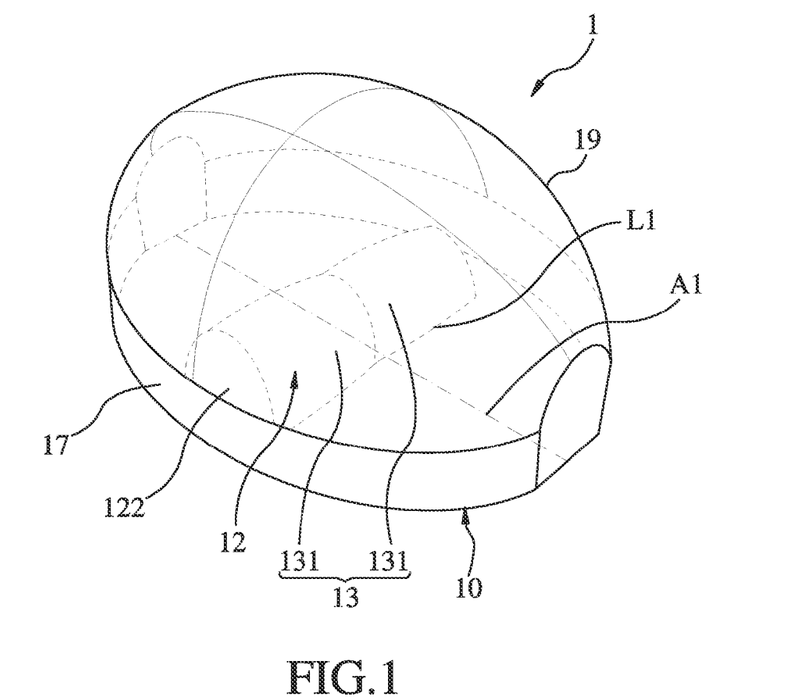
FIG. 1 is a perspective view of an optical lens for lighting fixture in accordance with a first embodiment of the present invention.
Figure 3:
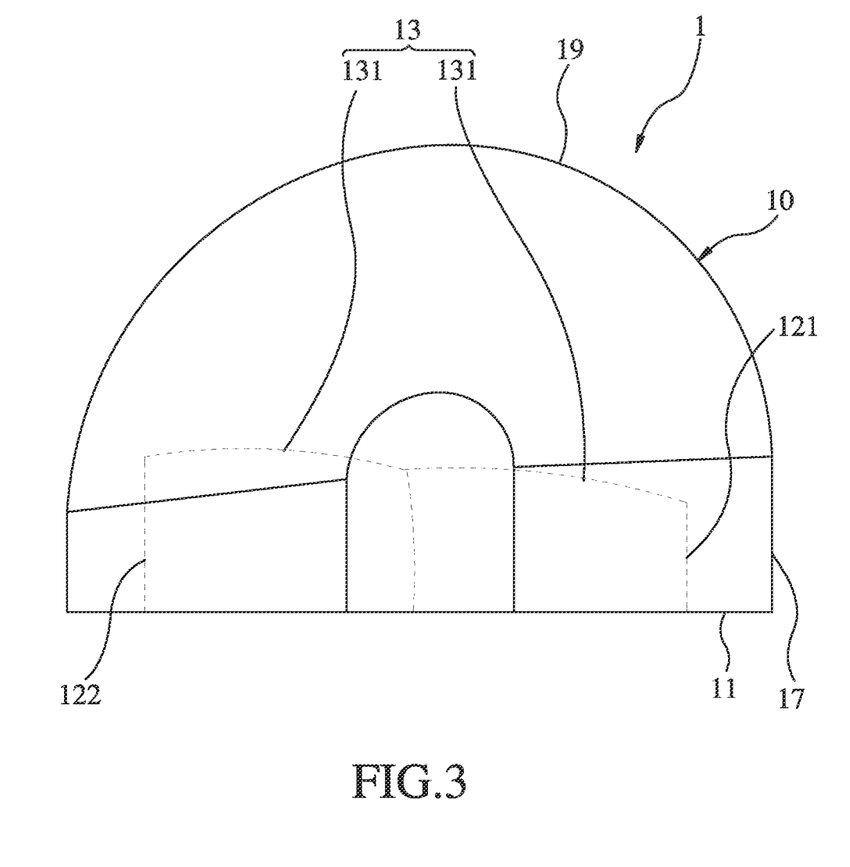
FIG. 3 is a side view of the optical lens for lighting fixture in accordance with a first embodiment of the present invention.

In this embodiment, the body 10 has an annular surface 17 between the light-exit surface 19 and the bottom surface 11. The design of this annular surface 17 enables the dimension of the body 10 to fit the present specification. However, this annular surface 17 is not imperative. In some other specifications, this annular surface 17 can be eliminated.

Further, in this embodiment, the shortest distance between the two ends of the second intersection line 112 is defined to be a second distance D2 that is greater or equal to the first distance D1. Because the streetlight is to be installed at a roadside, the emitted light must be polarized so that the illumination area can be shifted to the middle of the road. Therefore, the first distance D1 must be designed to be no longer than the second distance D2 to achieve this illumination area requirement.

Further, a height of the first end surface 121 is smaller than that of the second end surface 122, i.e., the side of the light incident surface 13 abutted to the first end surface 121 is lower than the side of the light incident surface 13 abutted to the second end surface 122. Therefore, the distance between the light incident surface 13 and the light-exit surface 19 at the side abutted to the first end surface 121 is longer than the side abutted to the second end surface 122. Therefore, when light goes through the light incident surface 13 into the inside of the body 11 and is deflected by the light-exit surface 19, the luminous area of the light passing out of the first end surface 121 is relatively larger, achieving road illumination in a larger width.

Therefore, in order to achieve uniform illumination, the aforesaid asymmetric design is necessary.

Under the condition of satisfying the equation (1), the curvature change of the light incident surface 13 in the second axis A2 is insignificant. Therefore, the light emitted by the light source (not shown) and deflected by the light incident surface 13 can be concentrated and then projected through the light-exit surface 19 onto the illumination area (for example, the road). Because the light is well concentrated, it can illuminate a far place, for example, a corner area, eliminating the problem of insufficient corner light, improving corner illuminance and uniformity of illumination.

Further, it is worth mentioning that when the first embodiment of the present invention is used in a streetlight, the first intersection line 111 is disposed at the side facing toward the middle of the road, and the second intersection line 112 is disposed at the side far from the middle of the road, the first axis A1 is disposed in parallel to the length of the road, and the second axis A2 is disposed in parallel to the width of the road.

Referring to FIGS. 1, 2 and 4 again, in this first embodiment, the first distance D1 is 3 mm, the second distance D2 is 3.5 mm, the height of the first end surface 121 (see FIG. 1) is 1.5 mm, the height of the second end surface 122 (see FIG. 1) is 2.5 mm, the length of the second axis A2 is 10.5 mm, the length of the first axis A1 is 15 mm. The maximum SAGi in this embodiment is 0.05 mm. When put this maximum SAGi of 0.05 into |SAGi/first distance|×100 of the equation (1), the result is 1.67 and is smaller than 2.8, satisfying the equation (1).

Figure 5:
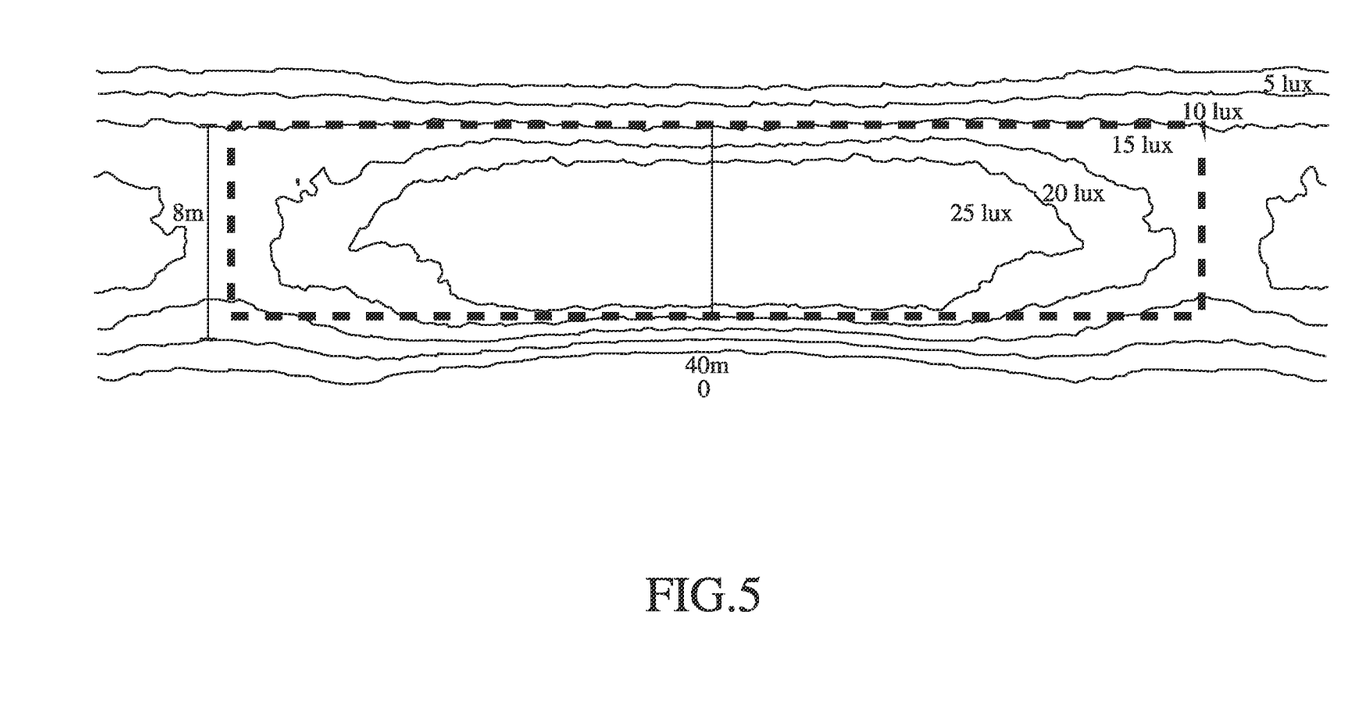
FIG. 5 is a schematic drawing illustrating a illuminance simulation of the optical lens for lighting fixture in accordance with the first embodiment of the present invention.

FIG. 5 illustrates a simulation of illumination of the first embodiment of the present invention. In this example, the height of the post of the streetlight is 10 m, the width of the road is 8 m, and the length of the road is 40 m (the area indicated by the imaginary line). The optical lens of this example provides a light extraction luminous flux 10,000 Lumen, the luminous flux within the area of the road is 7,500 Lumen, i.e., the light utilization efficiency of the optical lens for streetlight in accordance with this first embodiment of the present invention is 75% better than the light utilization efficiency of 60% of the prior art design; the uniformity of illumination of the optical lens for streetlight in accordance with this first embodiment of the present invention is 0.54, superior to 0.4 of the prior art design. The above-mentioned data and the corresponding conditions are arranged into the following Table I.

TABLE I

| | Luminous flux of lighting fixture (unit: lm) | luminous flux on the road (unit: lm) | light utilization efficiency | minimum illuminance (unit: lux) | average illuminance (unit: lux) | uniformity of illumination |
|---|---|---|---|---|---|---|
| Embodiment 1 | 10000 | 7500 | 75.0% | 12.7 | 23.4 | 0.54 |

Therefore, we can sure that the inner curved surface design of the optical lens in accordance with the first embodiment of the present invention effectively improves the uniformity of illumination.

Further, it is to be noted that the first end surface 121 and the second end surface 122 both face and incline downwardly toward the inside of the elongated groove 12 and are respectively connected to the bottom surface 11, facilitating mold stripping during fabrication.

Figure 6:
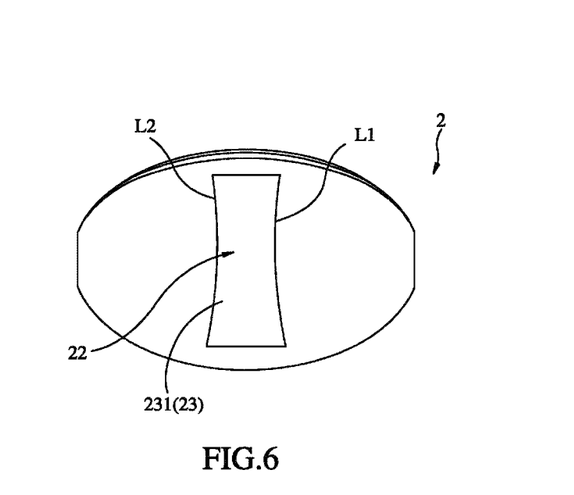
FIG. 6 is a bottom view of an optical lens for lighting fixture in accordance with a second embodiment of the present invention.
Figure 7:
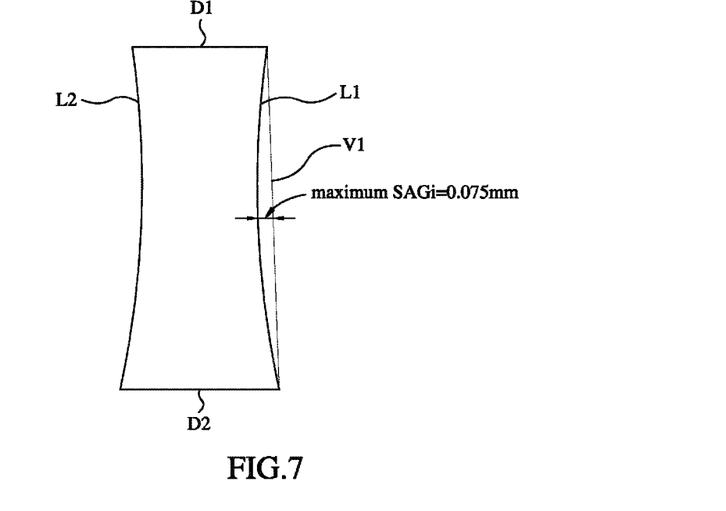
FIG. 7 is an enlarged view of a part of FIG. 6, illustrating the location and status of the maximum SAGi.

FIGS. 6 and 7 illustrate an optical lens 2 for lighting fixture in accordance with a second embodiment of the present invention. This second embodiment is substantially similar to the aforesaid first embodiment with the exception of the following features:

The light incident surface 23 is simply formed of one curved surface portion 231. Further, the first line segment L1 and the second line segment L2 curve inwardly toward the elongated groove 22.

The maximum SAGi of this second embodiment is 0.075. When put this maximum SAGi of 0.075 into |SAGi/first distance|×100 of the equation (1), the result is 2.5 and is smaller than 2.8, satisfying the equation (1).

The related data of this second embodiment can be gathered into the following Table II.

TABLE II

| | Luminous flux of lighting fixture (unit: lm) | luminous flux on the road (unit: lm) | light utilization efficiency | minimum illuminance (unit: lux) | average illuminance (unit: lux) | uniformity of illumination |
|---|---|---|---|---|---|---|
| Embodiment 2 | 10000 | 7425 | 74.3% | 11.6 | 23.2 | 0.50 |

Thus, the light utilization efficiency of this second embodiment is 74.3% better than the light utilization efficiency of 60% of the prior art design; the uniformity of illumination of this third embodiment is 0.50 better than the uniformity of illumination of 0.4 of the prior art design.

The other structural features and effect of this second embodiment are similar to the aforesaid first embodiment. No further detailed description in this regard will be necessary.

Figure 8:
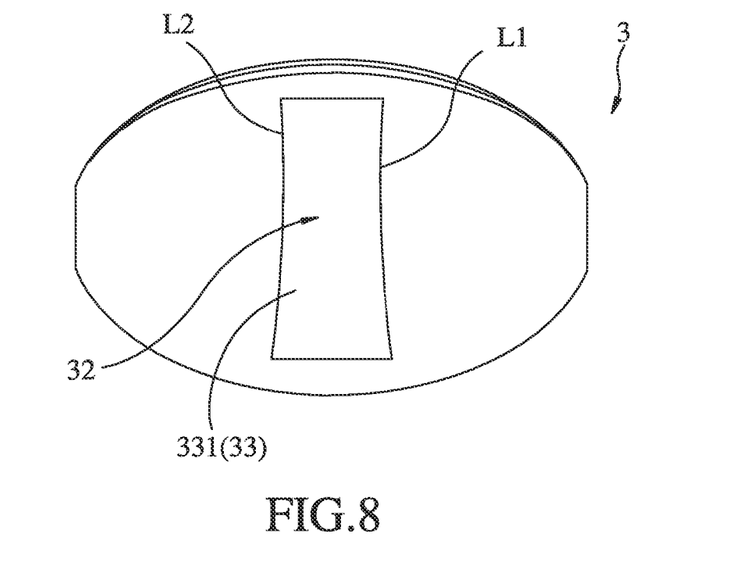
FIG. 8 is a bottom view of an optical lens for lighting fixture in accordance with a third embodiment of the present invention.
Figure 9:
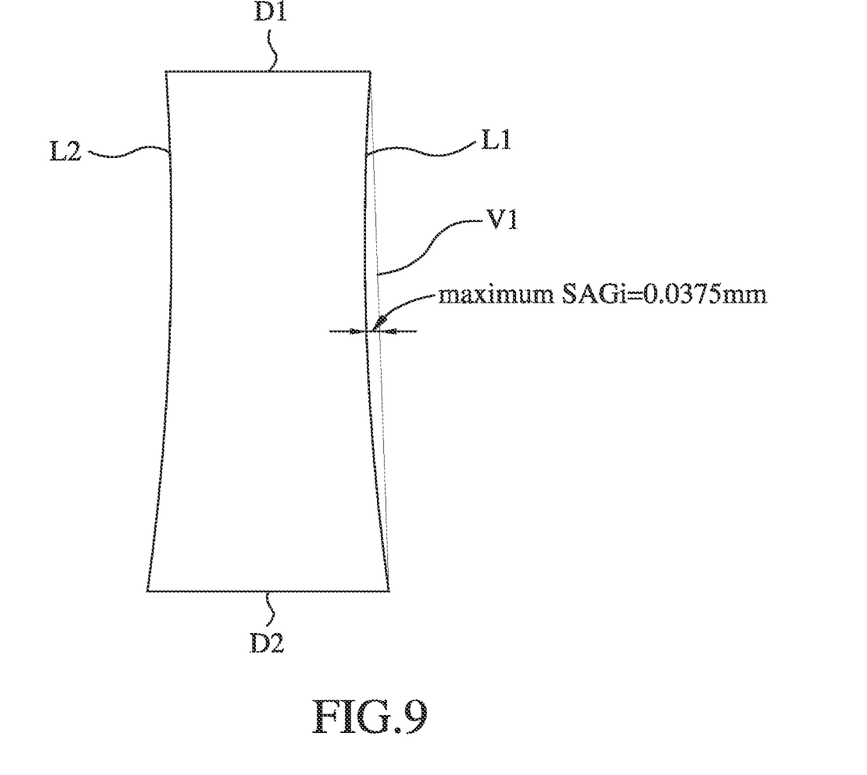
FIG. 9 is an enlarged view of a part of FIG. 8, illustrating the location and status of the maximum SAGi.

FIGS. 8 and 9 illustrate an optical lens for lighting fixture in accordance with a third embodiment. The optical lens 3 of this third embodiment is substantially similar to the aforesaid first embodiment with the exception of the following features.

The light incident surface 33 is simply formed of one curved surface portion 331. Further, the first line segment L1 and the second line segment L2 curve inwardly relative to the elongated groove 32.

The maximum SAGi of this third embodiment is 0.0375. When put this maximum SAGi of 0.0375 into |SAGi/first distance|×100 of the equation (1), the result is 1.25 and is smaller than 2.8, satisfying the equation (1).

The related data of this third embodiment can be gathered into the following Table III.

TABLE III

|  | Luminous flux of lighting fixture (unit: lm) | Luminous flux on the road (unit: lm) | light utilization efficiency | minimum illuminance (unit: lux) | average illuminance (unit: lux) | uniformity of illumination |
|---|---|---|---|---|---|---|
| Embodiment 3 | 10000 | 7500 | 75.0% | 12.9 | 23.4 | 0.55 |

Thus, the light utilization efficiency of this third embodiment is 75% better than the light utilization efficiency of 60% of the prior art design; the uniformity of illumination of this third embodiment is 0.55 better than the uniformity of illumination of 0.4 of the prior art design.

The other structural features and effect of this third embodiment are similar to the aforesaid first embodiment. No further detailed description in this regard will be necessary.

Figure 10:
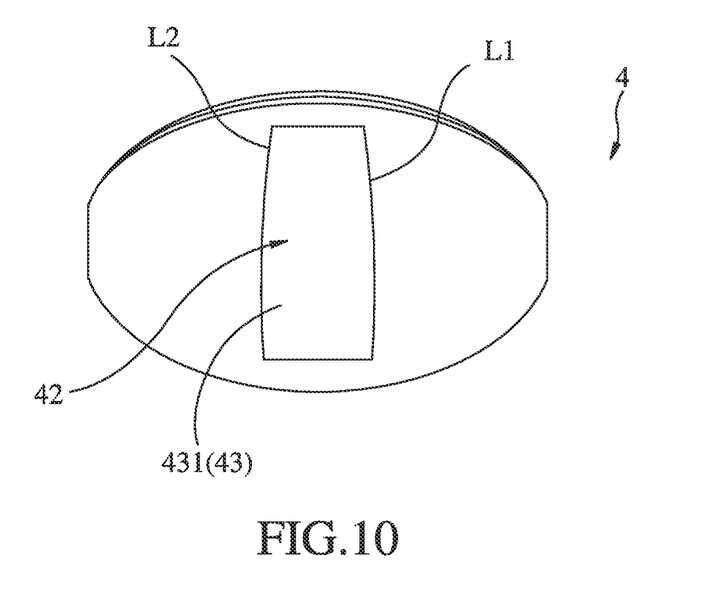
FIG. 10 is a bottom view of an optical lens for lighting fixture in accordance with a fourth embodiment of the present invention.
Figure 11:
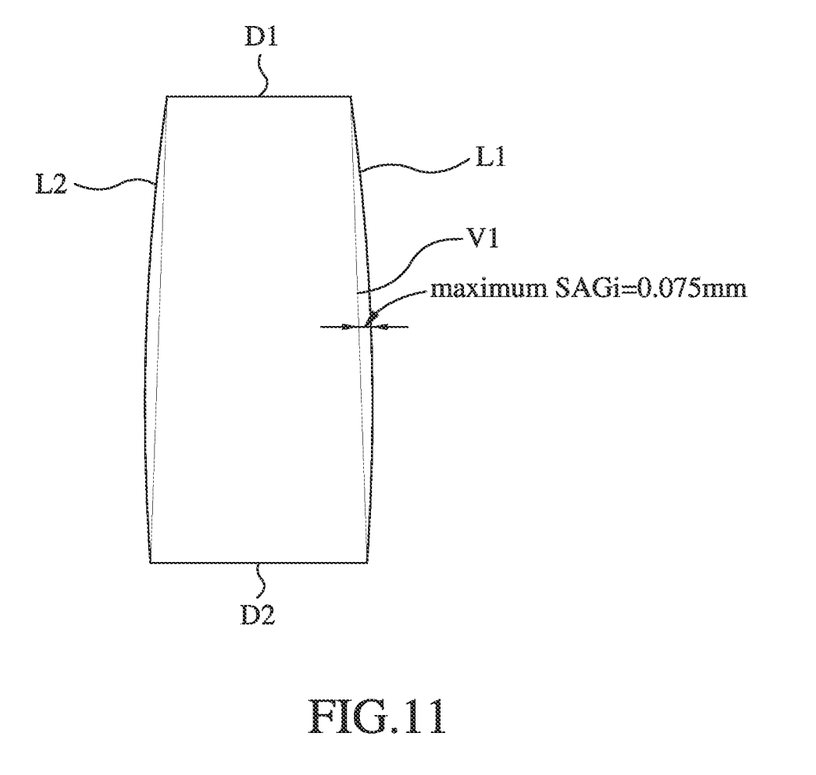
FIG. 11 is an enlarged view of a part of FIG. 10, illustrating the location and status of the maximum SAGi.

FIGS. 10 and 11 illustrate an optical lens for lighting fixture in accordance with a fourth embodiment. The optical lens 4 of this fourth embodiment is substantially similar to the aforesaid first embodiment with the exception of the following features.

The light incident surface 43 is simply formed of one curved surface portion 431. Further, the first line segment L1 and the second line segment L2 curve outwardly relative to the elongated groove 42.

The maximum SAGi of this fourth embodiment is 0.075. When put this maximum SAGi of 0.075 into |SAGi/first distance|×100 of the equation (1), the result is 2.5 and is smaller than 2.8, satisfying the equation (1).

The related data of this fourth embodiment can be gathered into the following Table IV.

TABLE IV

|  | Luminous flux of lighting fixture (unit: lm) | Luminous flux on the road (unit: lm) | light utilization efficiency | minimum illuminance (unit: lux) | average illuminance (unit: lux) | uniformity of illumination |
|---|---|---|---|---|---|---|
| Embodiment 4 | 10000 | 7388 | 73.9% | 11.5 | 23.1 | 0.50 |

Thus, the light utilization efficiency of this fourth embodiment is 73.9% better than the light utilization efficiency of 60% of the prior art design; the uniformity of illumination of this fourth embodiment is 0.50 better than the uniformity of illumination of 0.4 of the prior art design.

The other structural features and effect of this fourth embodiment are similar to the aforesaid first embodiment. No further detailed description in this regard will be necessary.

Figure 12:
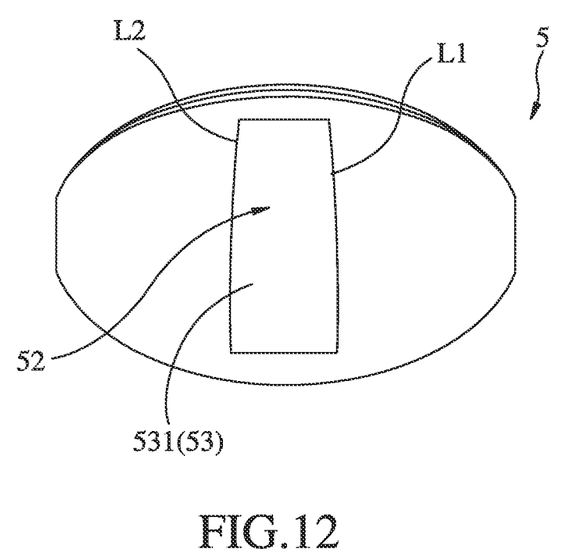
FIG. 12 is a bottom view of an optical lens for lighting fixture in accordance with a fifth embodiment of the present invention.
Figure 13:
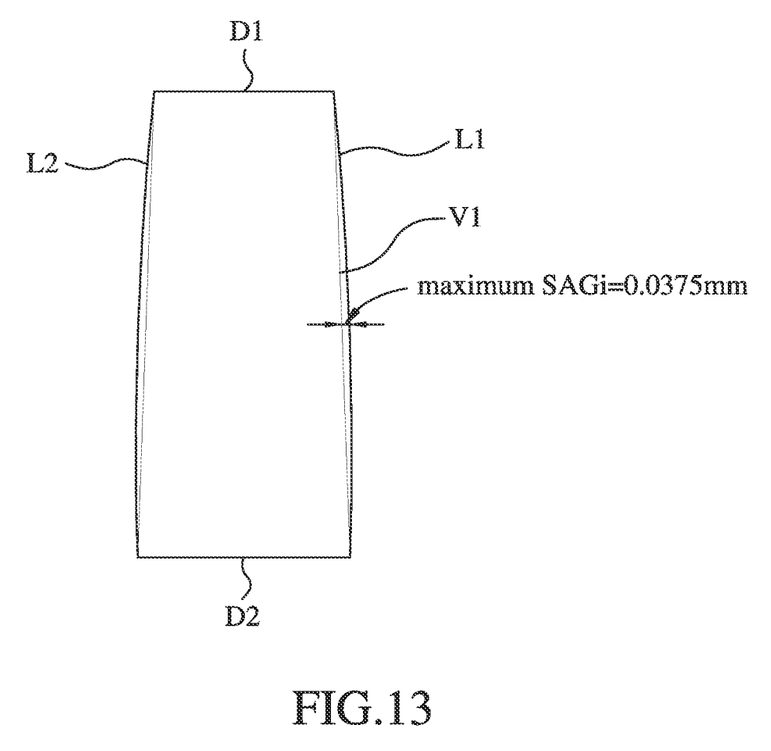
FIG. 13 is an enlarged view of a part of FIG. 12, illustrating the location and status of the maximum SAGi.

FIGS. 12 and 13 illustrate an optical lens for lighting fixture in accordance with a fifth embodiment. The optical lens 5 of this fifth embodiment is substantially similar to the aforesaid first embodiment with the exception of the following features.

The light incident surface 53 is simply formed of one curved surface portion 531. Further, the first line segment L1 and the second line segment L2 curve outwardly relative to the elongated groove 52.

The maximum SAGi of this fifth embodiment is 0.0375. When put this z maximum SAGi of 0.0375 into |SAGi/first distance|×100 of the equation (1), the result is 1.25 and is smaller than 2.8, satisfying the equation (1).

The related data of this fifth embodiment can be gathered into the following Table X.

TABLE V

|  | Luminous flux of lighting fixture (unit: lm) | Luminous flux on the road (unit: lm) | light utilization efficiency | minimum illuminance (unit: lux) | average illuminance (unit: lux) | uniformity of illumination |
|---|---|---|---|---|---|---|
| Embodiment 5 | 10000 | 7500 | 75.0% | 12.9 | 23.4 | 0.55 |

Thus, the light utilization efficiency of this fifth embodiment is 75.0% better than the light utilization efficiency of 60% of the prior art design; the uniformity of illumination of this fifth embodiment is the uniformity of illumination of 0.55 better than 0.4 of the prior art design.

The other structural features and effect of this fifth embodiment are similar to the aforesaid first embodiment. No further detailed description in this regard will be necessary.

Figure 14:
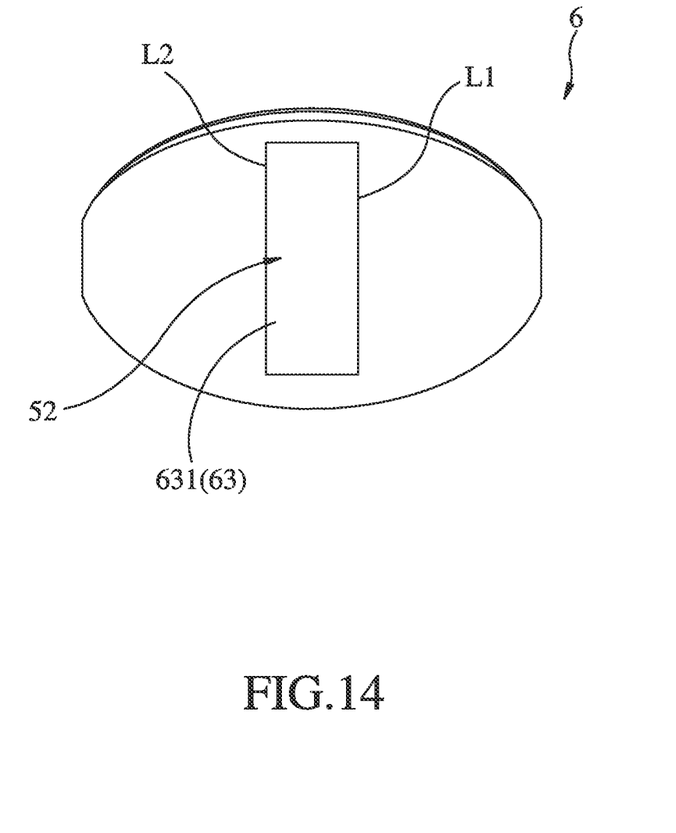
FIG. 14 is a bottom view of an optical lens for lighting fixture in accordance with a sixth embodiment of the present invention.

FIG. 14 illustrates an optical lens for lighting fixture in accordance with a sixth embodiment. The optical lens 6 of this sixth embodiment is substantially similar to the aforesaid first embodiment with the exception of the following features.

The light incident surface 63 is simply formed of one curved surface portion 631, and the first line segment L1 and the second line segment L2 are straight line segments.

The maximum SAGi of this sixth embodiment is 0. When put this zeroed maximum SAGi into |SAGi/first distance|×100 of the equation (1), the result is 0 and is smaller than 2.8, satisfying the equation (1).

The related data of this sixth embodiment can be gathered into the following Table XI.

TABLE VI

|  | Luminous flux of lighting fixture (unit: lm) | Luminous flux on the road (unit: lm) | light utilization efficiency | minimum illuminance (unit: lux) | average illuminance (unit: lux) | uniformity of illumination |
|---|---|---|---|---|---|---|
| Embodiment 6 | 10000 | 7500 | 75.0% | 13.6 | 23.4 | 0.58 |

Thus, the light utilization efficiency of this sixth embodiment is 75.0% better than the light utilization efficiency of 60% of the prior art design; the uniformity of illumination of this sixth embodiment is 0.58 better than the uniformity of illumination of 0.4 of the prior art design.

The other structural features and effect of this sixth embodiment are similar to the aforesaid first embodiment. No further detailed description in this regard will be necessary.

The data of the aforesaid $1^{st}$~$6^{th}$ embodiments are gathered into one table for reference as follows:

|  | Luminous flux of lighting fixture (unit: lm) | Luminous flux on the road (unit: lm) | Light utilization efficiency | Minimum illuminance (unit: lux) | Average illuminance (unit: lux) | Uniformity of illumination |
|---|---|---|---|---|---|---|
| Embodiment I | 10000 | 7500 | 75.0% | 12.7 | 23.4 | 0.54 |
| Embodiment II | 10000 | 7425 | 74.3% | 11.6 | 23.2 | 0.50 |
| Embodiment III | 10000 | 7500 | 75.0% | 12.9 | 23.4 | 0.55 |
| Embodiment IV | 10000 | 7388 | 73.9% | 11.5 | 23.1 | 0.50 |
| Embodiment V | 10000 | 7500 | 75.0% | 12.9 | 23.4 | 0.55 |
| Embodiment VI | 10000 | 7500 | 75.0% | 13.6 | 23.4 | 0.58 |

Thus, during application of the aforesaid $1^{st}$~$6^{th}$ embodiments, the light utilization efficiency of the aforesaid $1^{st}$~$6^{th}$ embodiments is about 75%, or above 73.9%, much better than the light utilization efficiency of 60% of the prior art design; the uniformity of illumination of the aforesaid $1^{st}$~$6^{th}$ embodiments is above 0.5, much better than the uniformity of illumination 0.4 of the prior art design. Further, the aforesaid $1^{st}$~$6^{th}$ embodiments all satisfy the equation (1). Therefore, we can be sure that the invention can effectively improve the uniformity of illumination and the light utilization efficiency.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical lens for lighting fixture, comprising a body, said body comprising a bottom surface at a bottom side thereof, a light-exit surface at a top side thereof, an elongated groove being concave in the direction towards the inner side of the body formed in said bottom surface for accommodating a light source, a first axis extending between two opposing ends of said bottom surface, a second axis extending between two opposing sides of said bottom surface across said first axis in a perpendicular manner, said first axis being longer than said second axis, said elongated groove comprising a major axis disposed in parallel to said second axis and a first end surface and a second end surface respectively disposed at two opposite ends thereof, a light incident surface being part of a wall of said elongated groove and connected with said first and second end surfaces, said first end surface and said second end surface being respectively intersected with said second axis, a first intersection line formed between said first end surface and said bottom surface, a second intersection line formed between said second end surface and said bottom surface, said light incident surface being formed of at least one curved surface portion, said at least one curved surface portion being connected to said bottom surface at two opposite sides of said elongated groove to form a first line segment at one side of said elongated groove and a second line segment at an opposite side of said elongated groove, said first line segment and said second line segment being disposed at two opposite sides relative to the major axis of said elongated groove in a symmetric manner relative to said second axis, said at least one curved surface portion being disposed at two opposite side relative to said second axis in an symmetric manner, a first virtual line being a straight line connected between two opposite ends of said first line segment, a first distance defined as the shortest distance between two opposite ends of said first intersection line, the shortest distance between any point at said first line segment and said virtual line being defined to be SAGi that satisfies the equation: 0≤|SAGi/first distance|×100≤2.8.

2. The optical lens for lighting fixture as claimed in claim 1, wherein a height of said first end surface is smaller than that of said second end surface.

3. The optical lens for lighting fixture as claimed in claim 1, wherein a second distance is defined as the shortest distance between two distal ends of said second intersection line and is greater or equal to said first distance.

4. The optical lens for lighting fixture as claimed in claim 1, wherein said first end surface is selectively a planar surface or curved surface; said second end surface is selectively a planar surface or curved surface.

5. The optical lens for lighting fixture as claimed in claim 1, wherein said first end surface and said second end surface are disposed perpendicularly to said bottom surface of said body.

6. The optical lens for lighting fixture as claimed in claim 1, wherein said first end surface and said second end surface both face and incline downwardly toward said elongated groove and are respectively connected to said bottom surface.

7. The optical lens for lighting fixture as claimed in claim 1, wherein said at least one curved surface portion is an elliptic surface, spherical surface, aspherical surface, or their combination.

8. The optical lens for lighting fixture as claimed in claim 1, wherein the amount of said at least one curved surface portion is 2, and the two curved surface portions are disposed at two opposite sides relative to said first axis in an asymmetric manner.

9. The optical lens for lighting fixture as claimed in claim 1, wherein said light-exit surface is asymmetric relative to said first axis.

10. The optical lens for lighting fixture as claimed in claim 1, wherein said body has an annular surface between said light-exit surface and said bottom surface.

* * * * *